(12) United States Patent
Shukla et al.

(10) Patent No.: US 7,543,003 B2
(45) Date of Patent: Jun. 2, 2009

(54) PROVIDING CHANGE NOTIFICATIONS TO AN ENTITY-REGARDING A CHANGE OF A SPECIFIC TYPE TO DATA IN A RELATIONAL DATABASE

(75) Inventors: Amit Shukla, Redmond, WA (US); Chang Luo, Redmond, WA (US); Hua Yuan, Sammamish, WA (US); James D. Ryseff, Redmond, WA (US); Johannes Klein, Sammamish, WA (US); Lijiang Fang, Bellevue, WA (US); Nigel R. Ellis, Redmond, WA (US); Siddhartha Singh, Sammamish, WA (US); Srinivasmurthy P. Acharya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 11/211,869

(22) Filed: Aug. 25, 2005

(65) Prior Publication Data

US 2007/0050392 A1  Mar. 1, 2007

(51) Int. Cl.
*G06F 17/30* (2006.01)
(52) U.S. Cl. ............................. 707/203; 707/1; 707/3; 707/9
(58) Field of Classification Search .................. 707/1, 707/3–6, 9, 100, 102, 103 R, 203, 205–206; 706/45–50; 715/968; 719/314, 318
See application file for complete search history.

(56) References Cited

U.S. PATENT DOCUMENTS 5,493,679 A * 2/1996 Virgil et al. ............... 707/104.1
6,292,803 B1 * 9/2001 Richardson et al. ......... 707/102
6,301,584 B1 * 10/2001 Ranger .................. 707/103 R (Continued)

FOREIGN PATENT DOCUMENTS

WO  WO 99/31566  * 6/1999

OTHER PUBLICATIONS

Martin Staudt, et al. "Active Change Notification in Advanced Knowledge Base Servers", IEEE 1996, pp. 96-99.*

(Continued)

*Primary Examiner*—Srirama Channavajjala
(74) *Attorney, Agent, or Firm*—Woodcock Washburn LLP

(57) ABSTRACT

A framework for data change notification includes a notification queue storing event notifications. Client applications can request event information regarding various data change events. For example, a client application can subscribe, via one or more APIs, to receive event information. The framework allows for session specific event notification mechanisms as well as durable event notification mechanisms that can be preserved across client sessions as well as server restarts. Innovative aspects of this invention include guaranteed delivery of event notifications, APIs to allow applications get summary of past events on the subscribed objects, automatic garbage collection/cleanup of notifications when a client session terminates.

11 Claims, 5 Drawing Sheets

U.S. PATENT DOCUMENTS

| | | | |
|---|---|---|---|
| 6,721,740 B1* | 4/2004 | Skinner et al. | 707/10 |
| 6,721,907 B2* | 4/2004 | Earl | 714/57 |
| 6,895,401 B2* | 5/2005 | Skinner et al. | 707/1 |
| 7,031,437 B1* | 4/2006 | Parsons et al. | 379/88.12 |
| 7,162,472 B2* | 1/2007 | Galindo-Legaria et al. | 707/4 |
| 7,315,863 B2* | 1/2008 | Kambo et al. | 707/101 |
| 7,412,436 B2* | 8/2008 | Trappen et al. | 707/3 |
| 2003/0046479 A1* | 3/2003 | Noble et al. | 711/100 |
| 2003/0055829 A1* | 3/2003 | Kambo et al. | 707/100 |
| 2004/0205048 A1 | 10/2004 | Pizzo et al. | 707/3 |
| 2004/0267741 A1 | 12/2004 | Galindo-Legaria et al. | 707/5 |
| 2005/0013257 A1* | 1/2005 | Garyfalos et al. | 370/252 |
| 2006/0155581 A1* | 7/2006 | Eisenberger et al. | 705/3 |

OTHER PUBLICATIONS

Hong-Tai Chou et al "Versions and Change Notification in an Object-Oriented Database System", 25th ACM/IEEE design automation conference, 1988, pp. 275-281.*

* cited by examiner

PROVIDING CHANGE NOTIFICATIONS TO AN ENTITY-REGARDING A CHANGE OF A SPECIFIC TYPE TO DATA IN A RELATIONAL DATABASE

BACKGROUND

In many computer systems, the storage and retrieval of information for and by computer applications is handled by one or more central storage systems. For example, one type of storage system commonly used in personal computers is a file-folder-and-directory-based system, also termed a "file system." Such file systems organize pluralities of files into hierarchies to create an abstraction of the physical organization of the storage medium used to store the files. Generally, such an organization into a hierarchy occurs at the operating system level. The files stored generally include the file hierarchy itself (the "directory") embodied in a special file maintained by the file system. This directory, in turn, maintains a list of entries corresponding to all of the other files in the directory and the nodal location of such files in the hierarchy (herein referred to as the folders).

The use of file system for central storage has several limitations. These may be overcome by using relational database technology as the underpinning of a central storage system.

In an application using data stored in a storage system, some activity of the application may be predicated on changes to the data stored in the storage system. Based on changes to individual objects or groups of objects in the store, applications may want execute relevant business logic or display logic. For example, an email program may wish to know when a new email message arrives. In certain systems, email messages arrive and are stored on the storage system. When a new message arrives, the email program can then perform any internal processing using the fact that a new email message has arrived or using the content of the email message. For example, some email programs contain rules used to process messages. The application of these rules is triggered, in some cases, by the arrival of a new message. Additionally, there may be user interface changes based on changes to data stored in the storage system. For example, upon the arrival of a new message, an alert may be presented to the user which indicates that a new message has arrived. A list of messages may be refreshed to include the new message.

The type of data change that an application may be interested include creation of objects, deletion of objects, updates to objects including moving an object or security changes to objects. The underlying relational database may not provide triggers which can be used to provide these updates.

Certain components require continuous monitoring of changes to objects stored in the relational database. For example, anti-virus programs require that changes to objects of certain types (including addition of such objects) trigger virus scans. Similarly, full-text indexing of entities is done on a continuous basis. If there is an interruption in the connection of an application to the underlying relational database, notifications may be lost and, upon resumption, it is possible that much work will be required to resume operations. Seamless resumption of monitoring (and responding) to changes, including changes occurring during the interruption of a connection of an application to the relational database, would allow savings in processing and time when the connection is resumed.

In view of the foregoing, there is a need for a change notifier that can be used in a database-based storage system and provides for good performance and scalability. The present invention satisfies this need.

SUMMARY

In order to provide change notifications, an application registers with a change notification system and allows applications to obtain, via a subscription, information regarding specified changes. The change notification system monitors changes to data in the underlying relational database and stores change information relevant to a request received in a queue. An application can access the relevant changes from the queue in order to determine what changes have occurred which are responsive to the application's request.

According to one embodiment, two kinds of watchers can be created. If an application requests a non-durable watcher, when that application loses connection with the change notification system or terminates, the remaining information in the queue for the application is removed, and no further tracking of changes responsive to the application's request occurs. However, when a durable watcher is requested, even if the application terminates or loses connection, the remaining information in the queue is retained, and any additional changes relevant to requests from the application are stored in the queue. When the application reconnects, the change information for the disconnected period is available in the queue, as is change information during and after the reconnection.

In this way, applications can access a rich set of event notification subscription options at various object scopes (at the level of individual items, folder contents or complete hierarchies of objects), and for various event types (create, update, delete operations), object types (documents, messages etc) and kind of objects (items, extensions, links etc). Additionally, event notifications are preserved across session terminations (voluntary or not) so that seamless resumption of monitoring is possible.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings.

DETAILED DESCRIPTION

Exemplary Computing Environment

Figure 1:
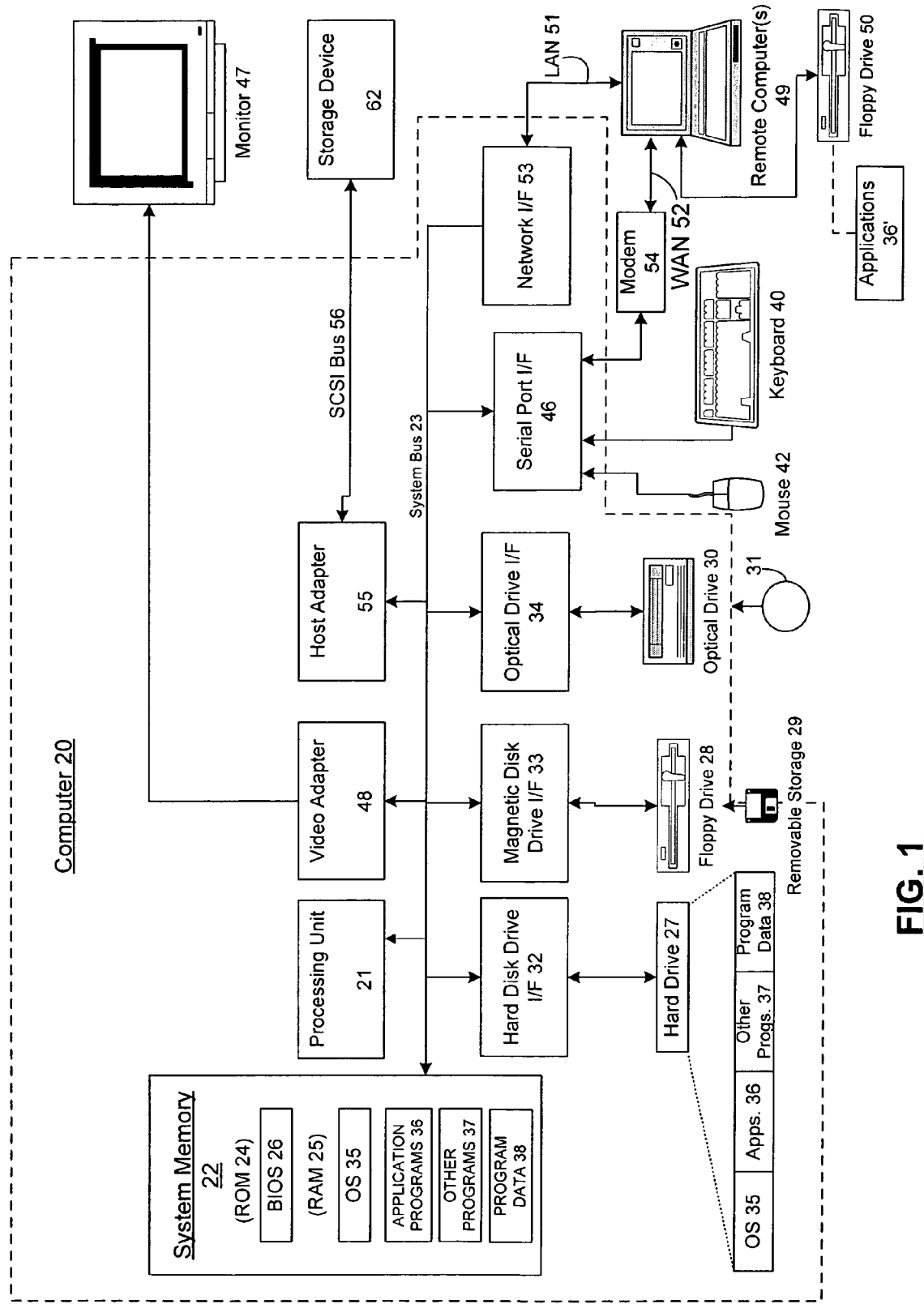
FIG. 1 is a block diagram representing a computer system in which aspects of the present invention may be incorporated.

Numerous embodiments of the present invention may execute on a computer. FIG. 1 and the following discussion are intended to provide a brief general description of a suitable computing environment in which the invention may be implemented. Although not required, various aspects of the invention may be described in the general context of computer executable instructions, such as program modules, being executed by a computer, such as a client workstation or a server. Generally, program modules include routines, programs, objects, components, data structures and the like that perform particular tasks or implement particular abstract data types. Moreover, the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Likewise, the exemplary environment may also include many types of monitoring devices such as heat sensors and security or fire alarm systems, and other sources of information.

A number of program modules may be stored on the hard disk, magnetic disk 29, optical disk 31, ROM 24 or RAM 25, including an operating system 35, one or more application programs 36, other program modules 37 and program data 38.

A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
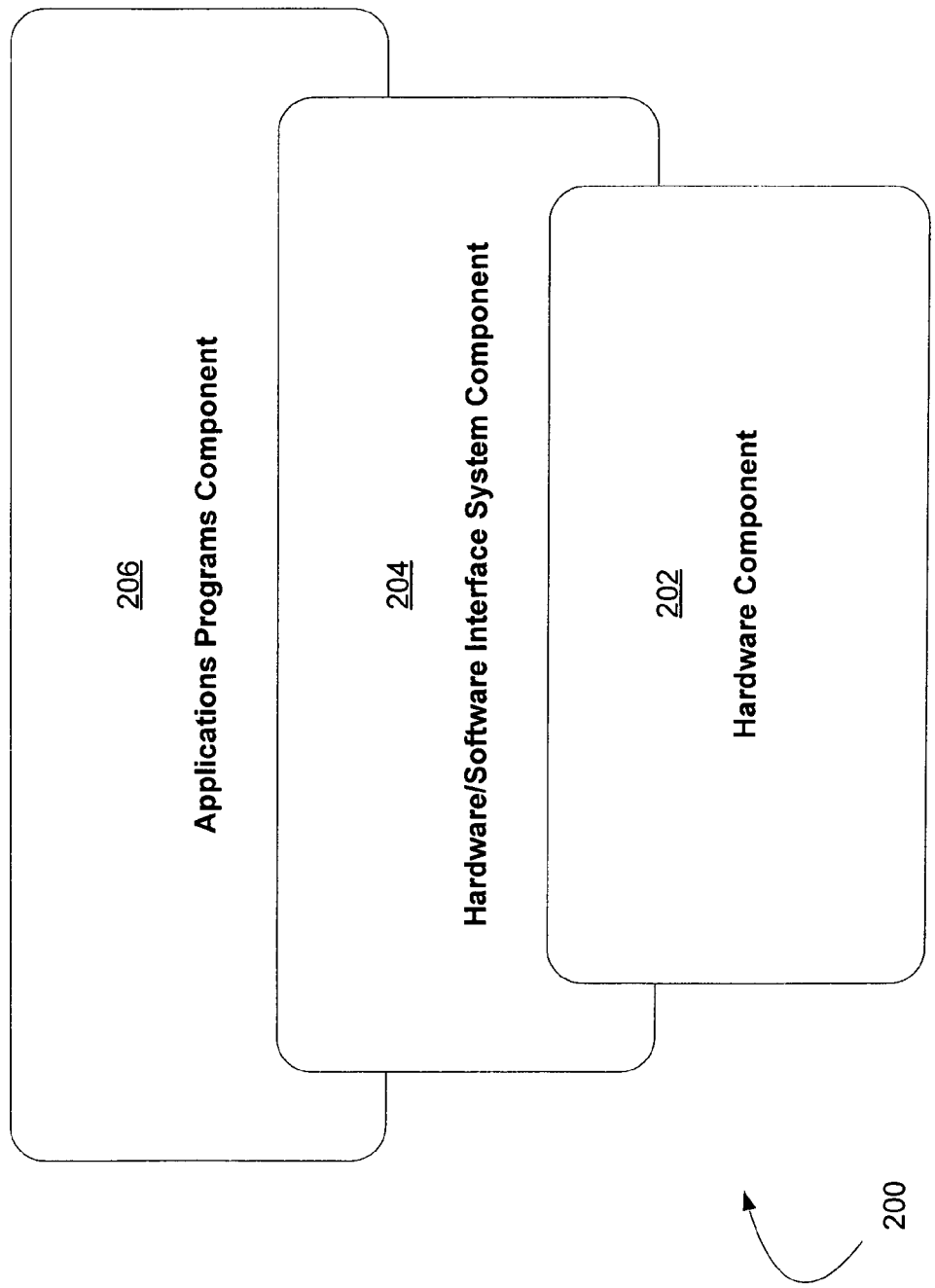
FIG. 2 is a block diagram illustrating a computer system divided into three component groups: the hardware component, the hardware/software interface system component, and the application programs component.

As illustrated in the block diagram of FIG. 2, a computer system 200 can be roughly divided into three component groups: the hardware component 202, the hardware/software interface system component 204, and the applications programs component 206 (also referred to as the "user component" or "software component" in certain contexts herein).

In various embodiments of a computer system 200, and referring back to FIG. 1, the hardware component 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic physical infrastructure for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component 204 comprises (and, in some embodiments, may solely consist of) an operating system that itself comprises, in most cases, a shell and a kernel. An "operating system" (OS) is a special program that acts as an intermediary between application programs and computer hardware. The hardware/software interface system component 204 may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/ software interface system is to provide an environment in which a user can execute application programs. The goal of any hardware/software interface system is to make the computer system convenient to use, as well as utilize the computer hardware in an efficient manner.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (simply referred to herein as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Data Change Notification

In order to allow applications to monitor changes in individual items, folders, or item domains stored in a storage system based at least in part on a relational database, a change notification framework is established. Monitoring may be specific to type of change event (creation, update, deletion, update to security settings, etc.)

Figure 3:
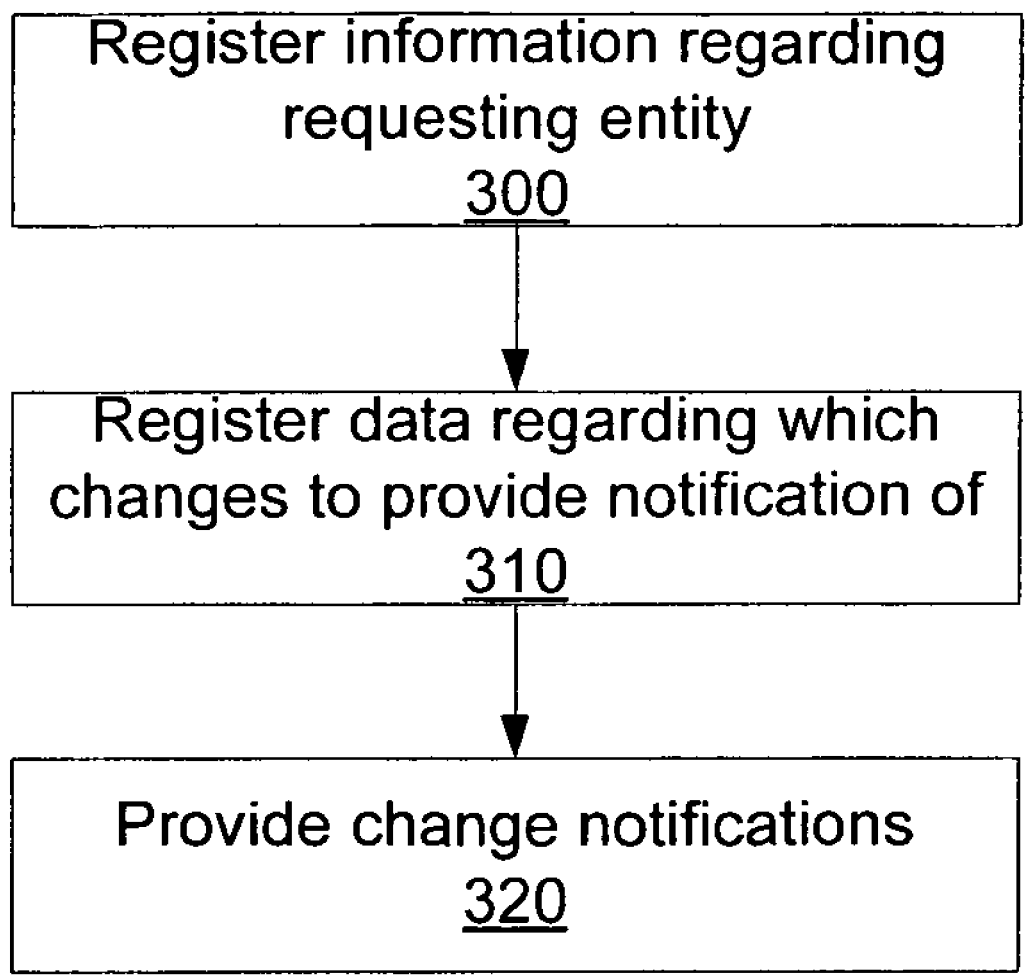
FIG. 3 is a flow diagram of the steps taken by a change notification system according to one embodiment of the invention.

According to one embodiment, a change notification system interacting with an application (or other entity) wishing to watch for changes in one or more entities, folders, or domains would proceed as shown in FIG. 3. FIG. 3 is a flow diagram of the steps taken by a change notification system according to one embodiment of the invention. As shown in FIG. 3, a first step 300 for the change notification system is to receive identification information regarding the entity making the request. In one embodiment, this constitutes a request for a notification client with the change notification system. The change notification system in one embodiment is integrated into the file system containing the relational database storage. In alternate embodiments, the change notification system is a layer or entity which is in communication (directly or indirectly) with the relational database storage.

The registration of a notification client allows the requesting entity to obtain a client handle from the change notification system. This allows the application a unique identifier in its transactions with the change notification system. In some embodiments, during client registrations security information is stored which allows the change notification system to determine what, if any, limits there are on the information that can be shared with the application via change notifications. In one embodiment, change notifications are only delivered for an item if the application has read access to the item.

After a notification client has been registered, as shown in step 310, information is registered regarding the changes the change notification system is to provide notifications of. In one embodiment, this is accomplished through registration of watcher subscriptions. The notification client from step 300 provides a handle which is used for registering subscriptions. Each subscription specifies one or more specific elements in the file system for which notification is requested. For example, in one example of a relational-database-based file system, the elements which can be watched may include entities, folders, and domains. Specification of elements may be direct (e.g. specifying a particular domain to watch) or otherwise (e.g. specifying all folders with names matching a certain regular expression.) Additionally, each subscription specifies what kind of data change event should be monitored. For example, a subscription may request notification on creation, deletion, or change of elements in the file system. In one embodiment, default values for elements specified and types of data change events may be present. Thus, for example, in such an embodiment, if no elements are specified (either by direct specific reference or otherwise) and no type of change is specified, notification is considered to be requested for all possible changes in all elements.

Watcher subscriptions can be registered at any time. After one or more watcher subscriptions have been registered, as shown in step 320, change notifications are provided to the requesting entity. In some embodiments, change notifications are provided synchronously. For example, a "Wait-ForChanges" method may be called by the requesting entity after the change notification system has registered entity information and change information to look for. Such a method will wait for changes—it will return a change notification as soon as it is noted by the change notification system. In other embodiments, the change notifications are provided asynchronously. In an asynchronous embodiment, the requesting entity can access its change notifications after an interval of time has passed, and the requesting entity receives all change notifications from the interval. Thus, a "ReadOldNotifications" method may be called which determines whether any notifications are pending for the requesting entity and returns with any pending notifications. In one embodiment, a method which combines the functionality of WaitForChanges and ReadOldNotifications is presented, which returns immediately when called with pending notifications if any exist, and if not, returns when changes are noted by the change notification system.

In one embodiment, change notifications are provided via the notification client from the change notification system. In another embodiment, the application signals that it is ready to receive such notification through calls to methods of the change notification system as described above. The notifications are returned as a collection of relevant changes. In one embodiment, the changes are returned as the result of a wait-for query executed on a queue of changes. A wait-for is a particular type of query (found, e.g., in database systems) which returns only when data matching the query is found. The queue may include changes for several watchers, however, the wait-for query (which returns only when data matching the query is found) is structured to receive only the changes which are responsive to the registered watcher subscriptions for that client.

Any number of watcher subscriptions may be registered from a single client. There is no limitation to a client registering new watcher subscriptions only shortly after creation, or only before notifications are requested or received. In the embodiment described above, all notifications relevant to any registered subscription are returned to the watcher in a single collection. In other embodiments, separate responses may be returned for each watcher subscription. In still other embodiments, no notification client is registered, but rather a single subscription client is registered, containing, embodying the notification client and one watcher subscription.

According to one embodiment of the invention, a watcher terminates when its connection to the change notification system terminates. At the point, or at some point afterwards during a cleanup, any notifications in the queue pertaining to the terminated watcher are deleted, and notifications responsive to the subscriptions of the watcher are no longer queued. This kind of watcher is termed a non-durable watcher. According to other embodiments of the invention, a type of watcher known as a durable watcher is provided.

Durable watcher clients are persisted across sessions. This allows applications which create durable watcher clients to ensure that they do not miss any changes that they have registered for. When the session which created the durable watcher client is ended, the change notifications for the client are not deleted from the queue. Instead, they are retained. In fact, all notifications on the queue for a durable watcher client are retained until the durable watcher client requests that they be deleted. When the application that created the durable watcher client reconnects after the termination, the queue will contain any notifications relevant to watcher subscriptions for that client which were on the queue at termination but for which deletion had not been requested, and any relevant notifications which were placed on the queue after the termination. The application then creates a new client and reads these notifications (and after reading them, can request that they be deleted in order to save space on the queue).

Because the durable watcher client's notifications are not removed from the queue until the durable watcher client requests that they be, there is increased confidence that the application will receive all relevant notifications. For example, if notifications are sent to the application running the durable watcher client but not received (e.g. because there was an unplanned termination in the connection) then the application will not request that they be deleted, and when the connection is reestablished, these notifications will still be available in the queue for the durable watcher. Durable watchers, in one embodiment, may request all change notifications in the queue which relate to changes which occurred between two given times (referenced by timestamp, counter clicks, or otherwise).

Either durable watchers, or non-durable watchers, or both may be provided, according to various embodiments of the invention.

Figure 4:
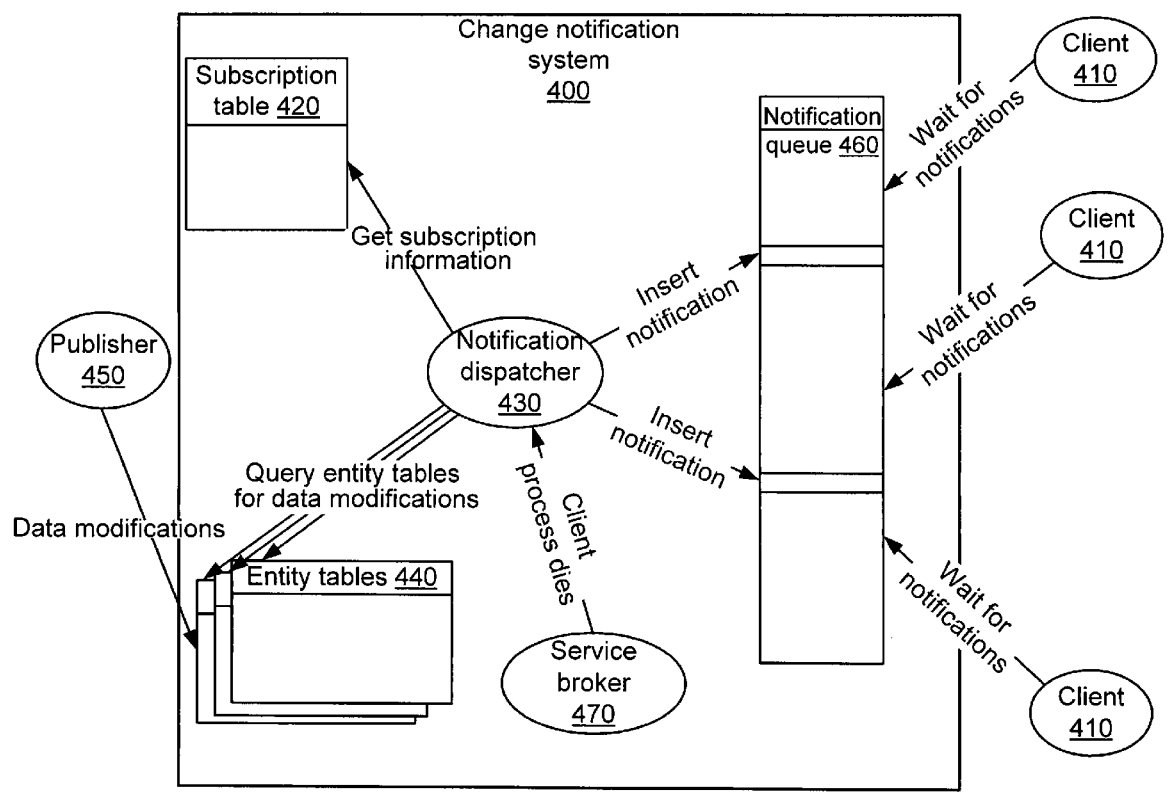
FIG. 4 is a block diagram of a change notification system and certain data flows according to one embodiment of the invention.

FIG. 4 is a block diagram of a change notification system and certain data flows according to one embodiment of the invention. As shown in FIG. 4, the change notification system 400 interacts with applications via clients 410. These clients 410 are the applications which register watcher clients and watcher subscriptions with the change notification system 400. Registration transactions are not shown in FIG. 4.

The information regarding watcher subscriptions (and associated client 410 identities for the watcher subscriptions) is stored in subscription table 420. In one embodiment, two tables are stored—a client subscription table and a watcher subscription table. The client subscription table stores all client registrations. For durable watcher clients, the information is maintained in the client subscription table until the durable watcher client requests that it be removed. For non-durable watcher clients, the client data is removed once the connection associated with the client is closed. Watcher subscription tables maintain information regarding registered watchers. Subscription table data may be schematized and stored as data in the relational database for which changes are being tracked, or as shown in FIG. 4, it may be separately stored.

Notification dispatcher 430 is at the heart of the change notification system 400. In one embodiment, the notification dispatcher 430 is a background thread which performs queries as indicated by subscription table 420 on the relational database (entity tables 440) and stores change notifications in the notification queue 460. The entity tables 440 can be changed by outside entities such as publisher 450. These data modifications occur to the entity tables 440 (the relational database underlying the storage system.) While entity tables are shown as being part of change notification system 400, they could also be separate from it.

In one embodiment, notification dispatcher finds responsive change information in entity tables 440 by performing a join operation on data from subscription table 420 and entity tables 440. In some embodiments, some of clients 410 may not be allowed to view all data in entity tables 440, and in such embodiments, change notifications are only stored on notification queue 460 for changes which the client 410 is allowed to access.

In one embodiment, notification queue 460 is implemented using relational database tables and the clients 410 use wait-for queries in order to determine whether change notifications responsive to watcher subscriptions have been placed into notification queue 460. Queue entries include a client identifier in order to identify which of clients 410 the change notification is intended for, and a timestamp. Since a number of change notifications may be delivered at once (e.g. in the case of a reconnected durable watcher), this timestamp allows the client 410 to know in what order the changes occurred. While notification queue 460 is presented as the way in which clients 410 receive information about change notifications, all methods of clients 410 receiving change notifications from notification dispatcher 430 are contemplated. Generally, in some embodiments the system consists of storage for change request information (subscription table 420), a notification dispatcher 430 which determines if relevant changes have been made, and a notifier which passes the notifications to clients.

Service broker 470 determines if a non-durable watcher client 410 has disconnected and, if so, cleans the queue of change notifications belonging to that non-durable watcher client 410. Service broker 470 also manages other client state information, such as information in subscription table 420, in order to keep the subscription table 420 up-to-date. Additionally, in one embodiment in which durable watchers are supported, service broker 470 determines if a watcher client 410 has requested removal of change notifications or termination, and performs clean-up operations on the subscription table 420 and the notification queue 460 as per those requests.

Figure 5:
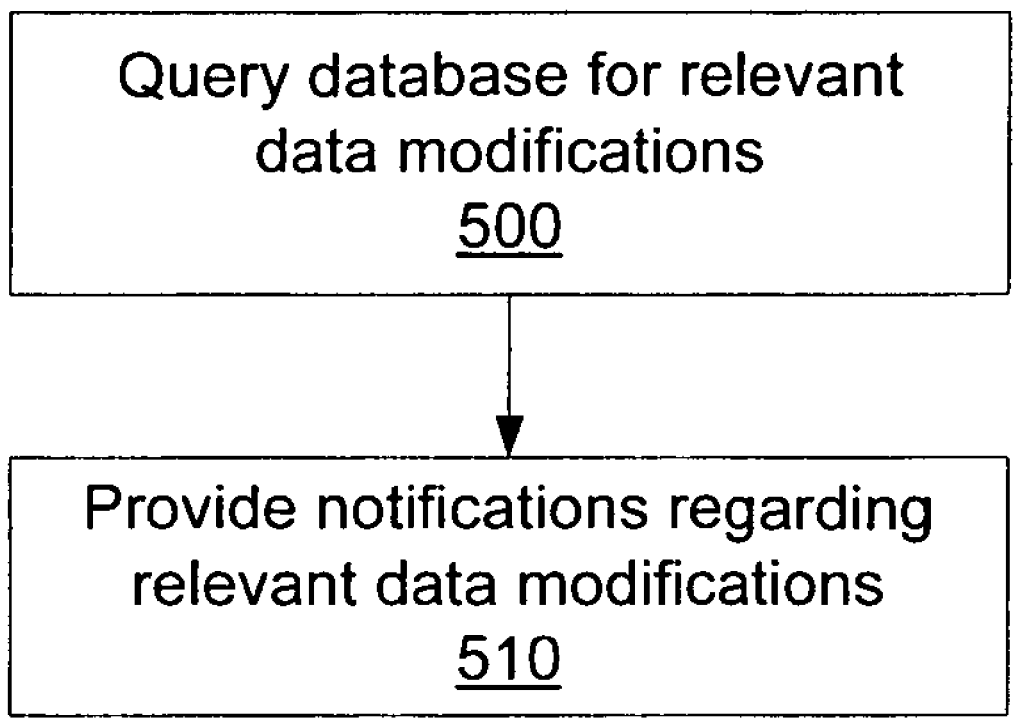
FIG. 5 is a flow diagram of the steps taken by the change notification system 400 in tracking changes for clients 410 according to one embodiment.

FIG. 5 is a flow diagram of the steps taken by the change notification system 400 in tracking changes for clients 410 according to one embodiment. As shown in FIG. 5, in a first step 500, the relational database is queried for relevant data modifications. In one embodiment, this step 500 is only performed when a change has occurred to the relational database.

In a second step 510, the relevant data modifications are provided to clients of the change notification system. Notifications include information about the change that occurred, for example what exactly was changed about the item being watched—the item itself, some component of the item, or some associated item. Additionally, notifications include information about the event type that triggered the notification. Any change in data or metadata regarding the item may be the source of a change.

The framework, in some embodiments, provides facilities for applications via exposed methods as part of an application programming interface. The facilities provided include:

Registration—An application can register a notification client. In this way, the individual notification subscriptions for an application can be handled via a single application-specific client handle.

Subscription—A registered notification client can register watcher subscriptions, specifying data change events (e.g. change events for an entity, folder or a domain) which are to be watched for. A notification client can register any number of such watcher subscriptions. (In other embodiments, no registration is necessary, and subscription is obtained directly by the application.)

Enumeration of Pending Changes—All pending data changes are enumerated for a subscribed watcher immediately after registering or during a restart.

Generation of Notifications—Notifications regarding data change events for which subscriptions have been registered are generated.

Queuing of Notifications—Notifications are enqueued in a notification queue in order to respond to subscribed watchers.

Provision of Notifications—Relevant notifications from notification queue are provided to subscribed watchers Termination—Provide a way to terminate an individual watcher or a notification client.

Cleanup—Fault-tolerant notification cleanup for non-durable watchers.

DeleteWatcher and DeleteClient—This is how a watcher indicates that it is finished and removes its information from the change notification system. Either deletion of individual watcher subscriptions or deletion of any client-related information can be requested. While these may be implemented for both durable watchers and non-durable watchers, in a durable watcher embodiment the durable watcher client must use these or the changes will continue to be enqueued for the client.

CONCLUSION

As the foregoing illustrates, the present invention is directed to a storage platform for organizing, searching, and sharing data. The storage platform of the present invention extends and broadens the concept of data storage beyond existing file systems and database systems, and is designed to be the store for all types of data, including structured, non-structured, or semi-structured data, such as relational (tabular) data, XML, and a new form of data called Items. Through its common storage foundation and schematized data, the storage platform of the present invention enables more efficient application development for consumers, knowledge workers and enterprises. It offers a rich and extensible application programming interface that not only makes available the capabilities inherent in its data model, but also embraces and extends existing file system and database access methods. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

As is apparent from the above, all or portions of the various systems, methods, and aspects of the present invention may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

What is claimed:

1. A computer-implemented method for providing change notifications to an entity-regarding a change of a specific type to data in a relational database, said method comprising:

receiving entity registration information from an entity requesting notification of data change events in a relational database, said registration information comprising information identifying said entity, information regarding whether the entity is registered as a durable entity or non-durable entity, and information that specifies a specific type of change to data in the relational database for which notification is requested;

monitoring for an occurrence of said specific type of change to data in the relational database;

providing change notification data to said entity, by storing said change notification data in a queue, regarding a change in said relational database of said specific type for which notification is requested, wherein said queue comprises additional change notification information items, each of said additional change notification information items corresponding to said entity;

deleting any of said additional change notification information in said queue corresponding to said entity, when said entity is registered as a non-durable entity and a connection to said entity is terminated;

when said entity is registered as a durable entity:
determining that a connection to said entity is terminated;
determining that a new connection to said entity exists; and
providing said additional change notification information items corresponding to said entity using said new connection;

persistently maintaining the entity registration information for said entity across a plurality of sessions, if said entity is registered as a durable entity; and removing the entity registration for said entity after termination of a session for which the entity registration information was created, if said entity is registered as a non-durable entity.

2. The method of claim 1, where said step of providing change notification data to said entity comprises:
responding to a request for data from said queue.

3. The method of claim 2, where said step of responding to a request for data from said queue comprises:
responding to a wait-for query executed on said queue.

4. The method of claim 1, where said step of responding to a request for data from said queue comprises:
determining using the entity registration information whether said request issued from said entity.

5. The method of claim 1, where said change involves a specific item in said relational database, where access to said specific item in said relational database is limited by a security requirement, said method further comprising:
determining that said entity fulfills said security requirement.

6. A system implemented at least in part on a processor, comprising:
subscription table storage storing entity registration information regarding an entity requesting notification of a change event in a database, said registration information comprising information identifying said entity, information regarding whether said entity is registered as a durable entity or a non-durable entity, and change information regarding at least one change definition, said change definition defining one or more possible changes to said database for which notification is requested by said entity;
a notification dispatcher, said notification dispatcher operatively connected to said subscription table storage, said notification dispatcher operatively connected to said database, and said notification dispatcher querying said database for database changes pertaining to said change definitions and receiving data regarding a pertinent change; and
a notifier, operatively connected to said notification dispatcher, said notifier operatively connected to said entity, said notifier providing at least one notification regarding said pertinent change to said entity during a current session for which the entity registration information was created, wherein:
said notifier comprises a queue storing at least one of said at least one notification regarding said pertinent change;
said queue receives queries from said entity;
said provision of at least one notification regarding said pertinent change is in response to said query;
the entity registration information for said entity is persistently maintained in the subscription table storage after termination of the current session, if said entity is registered as a durable entity; and
the entity registration for said entity is removed from the subscription table storage after termination of the current session, if said entity is registered as a non-durable entity.

7. The system of claim 6, further comprising:
a service broker, said service broker, if said operative connection between said notifier and said entity is terminated, removing all pertinent changes corresponding to said entity from said queue, if said entity is registered as a non-durable entity.

8. A computer-readable storage medium comprising computer-executable instructions that are executable by a computer for performing the steps of:
receiving entity registration information from an entity requesting notification of data changes in a relational database, said registration information comprising information identifying said entity, information regarding whether said entity is registered as a durable entity or a non-durable entity, and information that specifies a specific type of change to data in the relational database for which notification is requested;
monitoring for an occurrence of said specific type of change to data in the relational database;
providing change notification data to said entity, by storing said change notification data in a queue, regarding a change in said relational database of said specific type for which notification is requested, wherein said queue comprises additional change notification information items, each of said additional change notification information items corresponding to said entity;
deleting any of said additional change notification information in said queue corresponding to said entity, when said entity is registered as a non-durable entity and a connection to said entity is terminated;
when said entity is registered as a durable entity:
determining that a connection to said entity is terminated;
determining that a new connection to said entity exists; and
providing said additional change notification information items corresponding to said entity using said new connection;
persistently maintaining the entity registration information for said entity across a plurality of sessions, if said entity is registered as a durable entity; and
removing the entity registration for said entity after termination of a session for which the entity registration information was created, if said entity is registered as a non-durable entity.

9. The computer-readable storage medium of claim 8, wherein:
said notification data further comprises time data identifying a point in time;
said request for data comprises a range of time;
said time data for each of said responsive notification data items is contained in said range;
said request is a wait-for request on said queue; and the computer-executable instructions further configured to provide an API (application programming interface) method for an entity to register as one of said possible requesting entities.

10. The computer readable storage medium of claim 8, further comprising:
    providing an API (application programming interface) for one of said possible requesting entities to register a change definition corresponding to said entity.

11. The computer-readable storage medium of claim 8, where said step of providing data change data regarding said data change to one of said requesting entities is performed only after it is determined that said one of said requesting entities has access privileges to said data change data.

* * * * *